United States Patent [19]

Roberson

[11] 4,342,580
[45] Aug. 3, 1982

[54] METHOD OF AND MEANS FOR MONITORING FILAMENT BREAK-OUTS OR GLASS FLOOD CONDITIONS IN A GLASS FILAMENT-FORMING PROCESS

[75] Inventor: Cletis L. Roberson, Newark, Ohio

[73] Assignee: Owens-Corning Fiberglas Corporation, Toledo, Ohio

[21] Appl. No.: 239,299

[22] Filed: Mar. 2, 1981

[51] Int. Cl.³ .......................................... C03B 37/025
[52] U.S. Cl. ....................................... 65/2; 65/10.1; 65/29; 65/158
[58] Field of Search ...................... 65/2, 10.1, 29, 158

[56] References Cited

U.S. PATENT DOCUMENTS

4,130,406 12/1978 Wakasa et al. ...................... 65/29 X
4,229,198 10/1980 Coggin ................................. 65/10.1
4,266,961 5/1981 Wood ..................................... 65/29

Primary Examiner—Robert L. Lindsay, Jr.
Attorney, Agent, or Firm—Ronald C. Hudgens; Philip R. Cloutier; Kenneth H. Wetmore

[57] ABSTRACT

The disclosure embraces a method of and apparatus for automatically and remotely detecting and indicating when any filament breaks out or other discontinuity occurs in the process of attenuating streams of filament-forming material, such as glass, into filaments and wherein a break-out or discontinuity results in an accumulation or collection of the material or glass at the region of the break-out. The method of and apparatus for remotely detecting a filament break-out involve scanning the stream flow region of a stream feeder with a lens system or video camera, projecting the image of the stream flow region of the feeder by the lens system or camera onto a group or matrix of optoelectronic photo detectors wherein a detector is subjected to a change in state by an image of an accumulation or collection of the filament-forming material or glass at the orifice of the stream from which the break-out occurred, and utilizing the output of the affected detector for remotely indicating a filament break-out, or utilizing the output to activate means for eliminating the accumulated material or glass and restoring normal stream flow operation from the feeder.

32 Claims, 9 Drawing Figures

METHOD OF AND MEANS FOR MONITORING FILAMENT BREAK-OUTS OR GLASS FLOOD CONDITIONS IN A GLASS FILAMENT-FORMING PROCESS

TECHNICAL FIELD

This invention relates to a process of and apparatus for flowing glass streams from orifices in a stream feeder or bushing which are attenuated to continuous filaments or fibers by a suitable method or means such as winding a strand or linear group of the attenuated filaments into a wound package or filaments or groups of filaments which are deposited on a conveyor or the like and monitoring, detecting or indicating at a remote position the occurrence of filament break-out, glass flood condition or other discontinuity or impairment of glass stream flow in the process.

BACKGROUND ART

It has been conventional practice to flow streams of heat-softened glass from a stream feeder, bushing or substrate and the streams of glass attenuated to continuous filaments by winding a strand or linear group of the filaments into a package.

Break-outs of filaments at the stream flow region of the bushing or flooding of the glass at the region of the break-out have, up to the present time, been detected by direct visual observation of the stream flow region and action is then taken by the operator to remove the flood and restart operation to promote attenuation of all of the glass streams flowing from the stream feeder or bushing.

The observer or operator utilizes a tool known as a bushing pick or other means of effecting restart of the glass streams to initiate the attenuation of all of the streams to filaments. It is conventional to utilize a great many stream feeders or bushings receiving heat-softened glass from a single glass melting furnace and a single observer can conveniently observe only a small number of stream feeders for possible filament break-outs.

It requires the use of several observers or operators to monitor a large number of stream feeders. An observer or operator must be physically present in visually monitoring a small number of stream feeders so that a break-out may be quickly detected before it results in a major flooding condition of the floor of a stream feeder.

DISCLOSURE OF THE INVENTION

The present invention relates to a method of and apparatus for automatically detecting by remote monitoring means filament break-outs, glass flood, glass bead or other discontinuity that may occur at a stream flow bushing or feeder. The individual monitoring system or means for each of a plurality of stream flow bushings or feeders provides an optical image of the glass streams flowing from each stream feeder or bushing, the optical monitoring means being arranged to visually indicate the impairment of normal stream flow, filament break-out, flood condition or glass bead at an orifice and thereby indicate to an operator or attendent to immediately taken action to remove a flood condition or other impairment and restore normal glass stream flow from all of the orifices of a stream feeder.

An optical system is provided for each monitor for scanning the entire glass flow stream area of a feeder or bushing and the monitors for the several optical systems may be at a single station under constant observation by a single observer or operator.

Remove detection and indication of a filament break-out or other discontinuity of normal glass stream flow is achieved by the use of video-optoelectronic means wherein a normal transmitted image of cones of glass of the streams normally flowing from orifices in a stream feeder or bushing is reproduced on a monitor screen as a plurality of dots which indicate the cones of glass of the streams at the exit region of the orifices.

A filament break-out, the formation of a glass bead or glass flood causes an illogical or distorted configuration of glass at the orifices or an irregular image indicating a glass bead or flooded condition where normal glass stream flow is interrupted.

The trend in glass fiber or filament attenuating operations is to employ a stream feeder or bushing having a planar floor area provided with holes or orifices through which flow streams of glass for attenuation to filaments as this type of glass stream feeding enables the use of many more orifices in a given area.

The automatic detecting method and apparatus of the invention is particularly usable for detecting break-outs or discontinuities in stream flow from orifices in a flat plate or feeder floor as break-outs are more likely to occur in filament attenuating processes where the orifices are merely holes in the flat area of a stream feeder.

The remote detecting system of the invention is also usable with stream feeders or bushings where the floor of the feeder or bushing is provided with short length depending orificed projections through which streams of glass flow for attenuation to filaments although the likelihood of filament break-outs of streams from orificed depending projections is less prone to filament breakage and glass flooding.

The consequent change of state of the detector system in response to a filament break-out, glass flood, glass bead or other discontinuity may provide an electrical output to initiate an audible or visual alarm or to activate means to control flooding or for other control purposes such as glass temperature.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of the invention will be described in connection with the accompanying drawings in which.

BEST MODE FOR CARRYING OUT THE INVENTION

The method of the invention and the apparatus or system for carrying out the method are particularly adapted for use with a stream feeder, bushing or substrate wherein the bushing or feeder floor or orifice plate is formed with orifices through which flow streams of heat-softened fiber-forming material such as glass which are attenuated to filaments or fibers, the invention embodying a method and means other than visual observation of flowing streams of the material or glass from a bushing or feeder plate for detecting a fiber or filament break-out or other discontinuity of stream flow in the process of flowing streams of the glass or other fiber-forming material for attenuation to fibers or filaments.

More specifically the method of the invention and the apparatus for carrying out the method are especially adapted for remotely indicating a glass flood condition, a glass bead formation or discontinuity of stream flow at an orifice region of a stream feeder or bushing and through the method of detection of such condition to activate a signal or initiate a remedial action or means to remove the glass flood or glass bead and restore normal glass stream flow.

Figure 1:
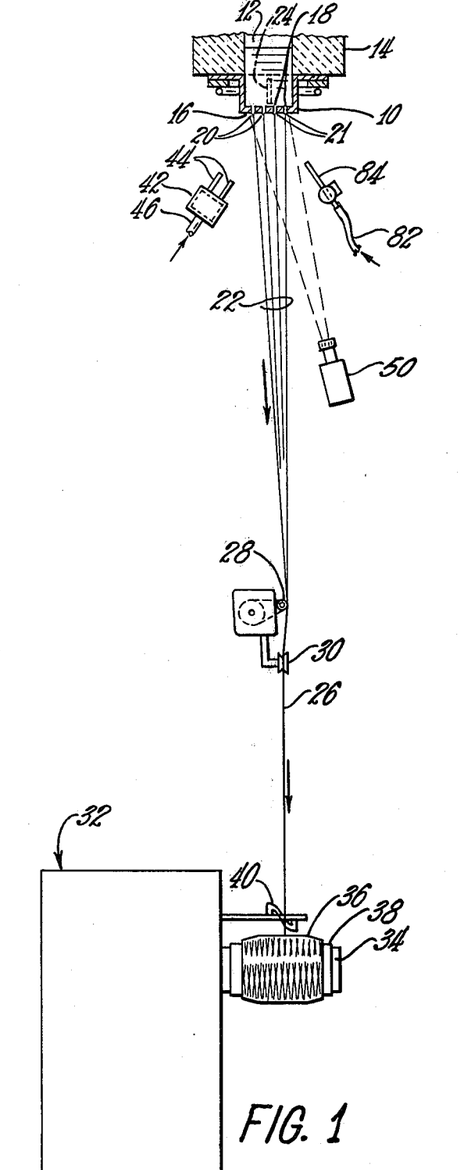
FIG. 1 is a schematic view of an arrangement for flowing streams of heat-softened glass from a feeder or bushing and attenuating the streams of glass to filaments in association with a video-photoelectronic system or means for automatically detecting a filament break-out, glass flood, glass bead or discontinuity in the process.

Referring initially to FIG. 1 there is illustrated a stream feeder, bushing or substrate 10 adapted to contain heat-softened mineral material such as glass. The feeder or bushing 10 is adapted to be supplied with molten or heat-softened glass from a channel 12 in a forehearth 14 which receives molten glass in a conventional manner from a melting furnace (not shown).

The feeder or bushing 10 is preferably fashioned of an alloy of platinum and rhodium or other high temperature resistant material. The feeder or bushing 10 is provided with a floor section or tipless orifice plate 16 of platinum alloy provided with a large number of orifices or openings 18 through which flow streams 20 of glass.

The streams 20 of glass adjacent the orifices are in the shape of short cones 21, the glass being attenuated to continuous fibers or filaments 22. Each end of the feeder or bushing 10 is fashioned with a terminal lug 24 for connection with current supply conductors (not shown) for passing electric current through the feeder or bushing to maintain the glass in the feeder or bushing at the desired temperature and viscosity for flowing streams 20 of glass from the feeder or bushing.

The glass streams 20 flowing from the orifices 18 in the floor or orifice plate of the bushing or stream feeder are attenuated to continuous filaments or fibers 22 by winding a strand or group 26 of the fibers or filaments into a package. The filaments 22 are preferably engaged with an applicator 28 for applying size or other coating material onto the filaments. The filaments are converged into a strand or linear group 26 by means of a gathering shoe or member 30.

A winding machine 32 is equipped with a rotatable collet 34 driven by a motor (not shown), the strand 36 being wound into a package 36 on a thin-walled forming tube 38 mounted on the collet 34. The speed of the winding collet is programmed in a conventional manner whereby the glass streams are attenuated to filaments 22 at a substantially constant rate so that the filaments throughout the package are of substantially the same diameter or size.

A rotatable and reciprocable traverse means 40 of conventional character engages the strand 26 and distributes the strand lengthwise of the collet, the traverse means oscillating the strand to effect a crossing of the individual wraps or convolutions of strand during the collection of the strand into a package.

In the use of a planar floor section or orifice plate 16 having stream flow orifices without orificed tips or projections depending from the floor or plate, or if the orifice projections are very short, it is essential to direct jets or streams of air or other gas upwardly into contact with the floor section or orifice plate 16.

As shown in FIG. 1 a manifold 42, containing air or gas under pressure, is provided with rows of nozzles 44 directed upwardly toward the region of the orifice plate or floor section 16. The manifold 42 may be connected by tubular means 46 with a blower or source of compressed air for delivery from the nozzles 44.

The purpose of the air streams or gas streams from the nozzles 44 is to cool the orifice plate or floor section 16 as well as to cool the glass streams and thereby raise the viscosity of the glass of the streams to an efficient attenuating temperature.

The U.S. Pat. Nos. 4,202,680 and 4,222,757 disclose a method and apparatus for delivering fluid or air streams onto an orifice plate or floor section for conveying away heat to raise the viscosity of the glass of the streams to an efficient attenuating temperature.

One of the major difficulties encountered in flowing a large number of glass streams from a stream feeder for attenuation to filaments or fibers wherein the streams are closely spaced is the occurrence of filament or fiber break-outs, formation of beads of glass or stream flow discontinuities which cause flooding of the glass at the orifice plate or bushing floor. Heretofore an operator was usually unaware of such abnormal condition until he or someone specifically visually observed a filament break-out or stream discontinuity.

If a filament break-out occurs, flooding or formation of a bead of glass is promoted at the orifice plate or feeder floor and may quickly impair or interrupt flow of other adjacent streams of glass causing a severe flooding condition which requires substantial downtime in order to restore normal stream flow.

The invention is inclusive of a method of and apparatus or system for remotely and automatically detecting the occurrence of a fiber or filament breakage or discontinuity of glass stream flow in a fiber or filament forming operation so that corrective measures may be taken either manually or automatically to restore normal stream flow from the orifice plate or floor section of a stream feeder.

The method and apparatus involve a monitoring system for visually indicating to an operator at a position remote from the filament-forming operation the occurrence of a filament breakage or stream flow discontinuity evidenced by a collection or accumulation of glass at the stream feeder in the form of a flood condition or formation of a bead of glass. The monitoring or detecting system may be arranged to indicate a visual or audible signal of a filament break-out or stream flow discontinuity or the system may be utilized for initiating a corrective action for automatically eliminating the flood condition or bead formation and restore normal stream flow at the region of the filament break-out or stream flow discontinuity.

The need for a monitoring system for detecting and quickly obviating a filament break-out, bead formation or flood condition at a stream flow area is particularly great in the use of a stream flow tipless orifice plate or tipless orifice feeder floor as the trend is toward the use of such stream flow apparatus to obtain a greater production of fibers or filaments necessitating a greater number of stream flow orifices or holes closely spaced in a given area.

With closely spaced glass streams, filaments are more likely to break out and a flood condition spread over a large area of the stream flow region unless the stream flow discontinuity is immediately corrected.

The detection of a filament break-out or stream discontinuity may be achieved by video-optoelectronic means. The stream flow or glass cone forming area at the bushing floor or orifice plate is surveyed or scanned by a closed-loop video camera. The image is then reproduced by an oscilloscopic type electron gun or projector on a phosphor screen, that is, a video receiver. The receiver screen is appropriately arranged with matrix intersections corresponding to the spatial locations of the orifices in the bushing floor or orifice plate.

Figure 2:
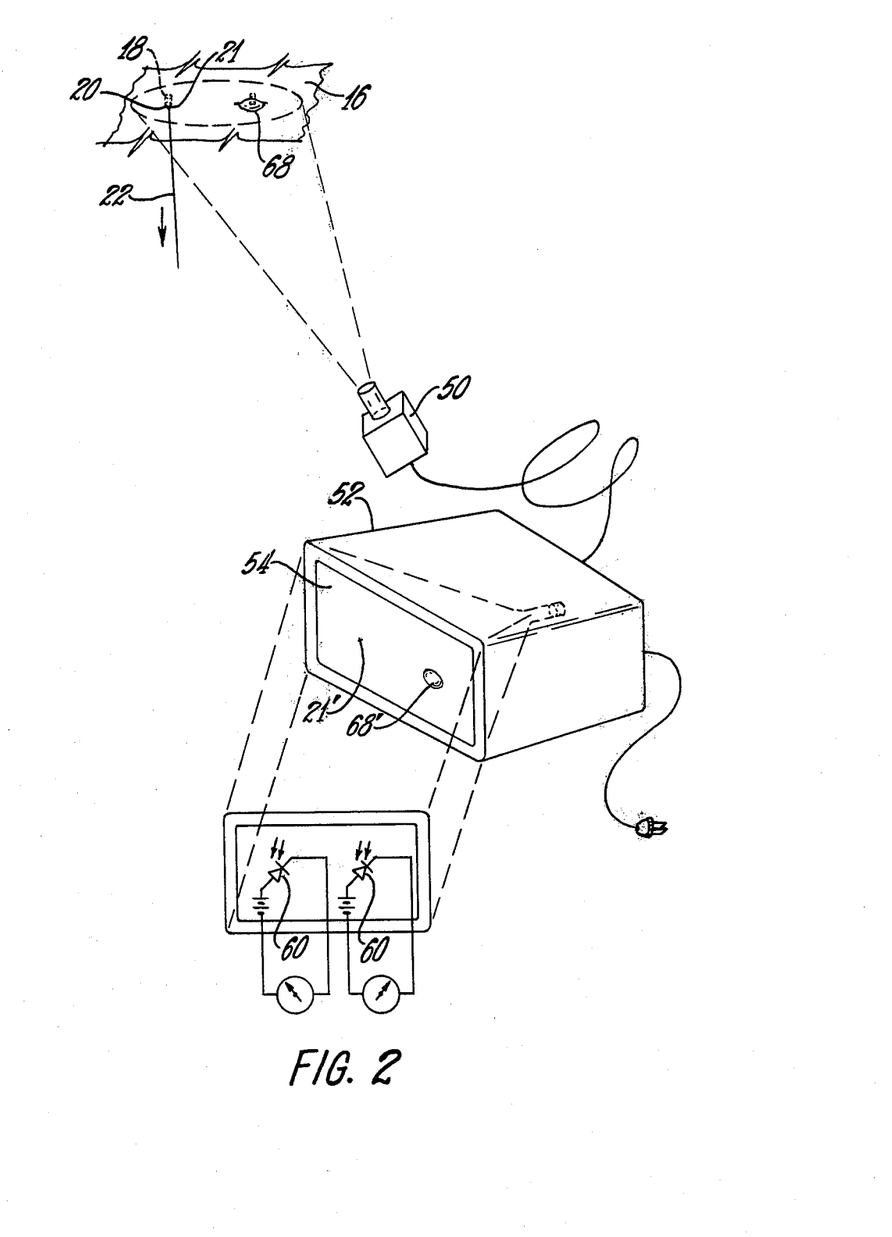
FIG. 2 is a semischematic illustration of the method or system involving a video camera and a sensing detector system for indicating a filament break-out, glass bead, glass flood or discontinuity of stream flow from a feeder, and a receiver for displaying an image of such abnormality in the process.

With particular reference to FIGS. 1 and 2, a video camera or vidicon tube 50 is positioned so as to scan the stream flow region of the bushing floor or orifice plate 16 so that during normal stream flow operations the cones of glass at the exits of the stream flow orifices will provide substantially identical images from the video camera and may appear as small dots on a television screen. The output of the camera is connected to a television receiver 52 or the like provided with a phosphor screen 54.

Figure 7:
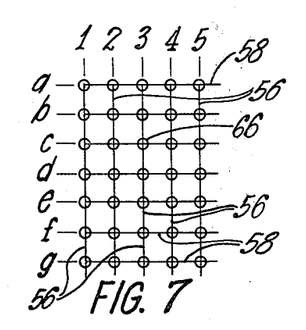
FIG. 7 is a representation of dots on a receiver screen indicating normal flow of glass streams from a stream feeder.

The screen 54 is appropriately arranged to provide a matrix corresponding to the spatial locations of the orifices in the bushing floor or orifice plate 16 as shown in FIG. 7. The matrix dimensions may be proportionately scaled relative to the actual size of the bushing floor or orifice plate 16 by the use of appropriate vertical lines 56 provided by vertical sweep amplifiers and the horizontal lines 58 provided by horizontal sweep amplifiers, the matrix intersections of the lines defined by the vertical and horizontal lines of sweep amplifiers corresponding to the spatial locations of the orifices.

Arranged adjacent and rearwardly of the phosphor screen 54 is a plurality of electronic photo detectors or sensors 60 which correspond in number and relative position to the number of stream flow orifices in the plate or floor 16.

Figure 6:
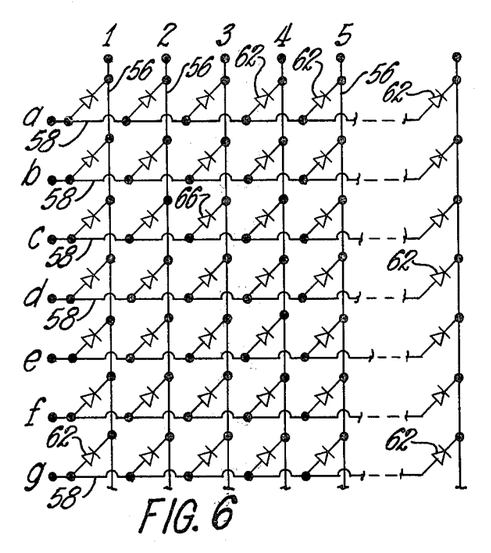
FIG. 6 is a schematic illustration of a portion of a matrix array of sensing detectors for the streams of glass which senses or detects abnormalities in stream flow and provides an image of the normal flow or interruption of a glass stream.

The detectors or sensors 60 may be light sensitive and/or spectrally sensitive optoelectronic radiometric devices 62, shown in FIG. 6, each detector or sensor being individual to a glass cone 21 of a stream 20 flowing from an orifice 18 in an orifice plate or bushing floor 16, shown in FIGS. 1 and 2. The television receiver 52 encloses the group of electronic photo detectors 60 such as the optoelectronic radiometric devices 62 or other detector means.

While only two detectors 60 are illustrated schematically in FIG. 2, it is to be understood that there is an electronic photo detector for each of the orifices 18 in the bushing floor or orifice plate 16. Each intersection of the vertical lines 56 with the horizontal lines 58, shown in FIGS. 6 and 7, represents a unique and discrete logic condition.

For example, the programming may be designed so that all of the intersections would be in the (o) or "not" state when all of the streams are flowing normally from all of the orifices in the orifice plate or bushing floor 16 and that all of the glass streams are being attenuated to filaments.

When a filament break-out occurs, the glass of the stream at the region of the cone forms a bead or glass flood which, for example, may occur at intersection c3, the intersection being designated 66 in FIGS. 6 and 7. A discontinuity of stream flow, a bead or glass flood following a break-out is indicated at 68 in FIG. 2. Then termination c3 would cause a visible change to a "plus one" state which is distinctly visible on the screen 54 at a discrete singular outline or image 68' on the television screen 54.

The position of this discrete singular image 68' is in the c3 position on the television screen thereby indicating on the monitor the exact filament break or discontinuity of stream flow at a particular orifice on the orifice plate or bushing floor 16. A normal stream, for example the stream 22, flowing from an orifice 18 and providing a normal glass cone 21, on the monitor or phosphor screen 54 appears as a point 21' in space.

Either the pressure of or the absence of the "T-V" electroscopic trace at one of the optoelectronic photo detectors 60 or light sensitive and/or spectrally sensitive devices 62 will cause a change of state of the detector at that matrix location to indicate a filament break-out, a glass flood condition, glass bead or discontinuity of stream flow at a particular orifice in the bushing floor or orifice plate 16.

Although a "standard" number of sweep lines may be used, it is preferable that the vertical sweep lines and the horizontal sweep lines correspond to the rows of orifices, that is, correspond to the bushing layout of orifices and the matrix array. Blanking pedestals should be applied between horizontal matrix dots to reduce background light.

The vidicon tube (camera) output may be filtered to increase the contrast between the shorter wave emissions of the high temperature platinum alloy orifice plate or bushing floor and the radiation from the cooler forming cone, glass bead or flood condition.

The filtering may either remove most of the shorter wave lengths, that is visible radiation, and pass longer wave lengths or visa versa. The matrix would be programmed accordingly to distinguish the presence or absence of a forming cone, a bead of glass or a glass flood.

Several monitors receiving signals from several orifice plates or bushings may be grouped at a single station so that an operator at the station may be instantly alerted to any filament break-out, bead formation, glass flood or discontinuity of glass stream flow from orifices in any of several orifice plates or bushings so that remedial action may be instantly taken to restore normal stream flow from all of the orifices of an orifice plate or a bushing of the monitored group.

The consequent change of state or signal indicating a filament break-out, glass bead formation, glass flood or other discontinuity adjacent an orfice may be utilized to initiate means for restoring normal stream flow from an orifice at which stream flow continuity has been impaired or interrupted.

Figures 3, 4, 5:
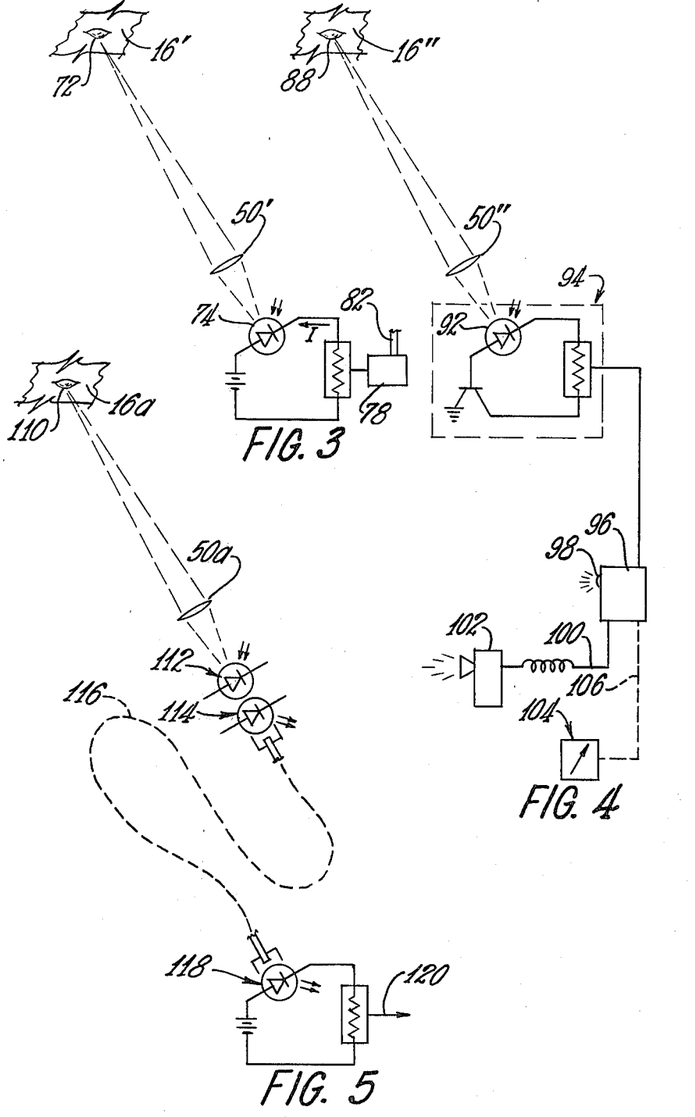
FIG. 3 is an illustration of circuitry involving a view lens system and a photo conductive means for indicating or sensing a filament break-out or discontinuity of normal flow of a glass stream from a stream feeder, the view illustrating the use of electrical output of a sensing circuit for initiating action to eliminate the abnormal operation of the process.
FIG. 4 is a schematic view similar to FIG. 3 wherein the electrical circuit of the photovoltaic detector circuit activates an optical signal, an audible signal, or means for initiating an action to restore normal stream flow following filament break-out or other abnormality in the process.
FIG. 5 is a schematic view of circuitry involving a camera lens system, a sensor or detector means and fiber optic transmitting means for transmitting electrical output provided by the sensor or detector following a filament break-out or abnormality in glass stream flow to a signal system or means for initiating action to remove the abnormal condition for restoring normal stream flow.

FIG. 3 illustrates an arrangement for transmitting a signal indicating the impairment or discontinuity of stream flow to a means for initiating an action to restore normal stream flow. In FIG. 3 the orifice plate or bushing floor 16' has a stream flow discontinuity, glass bead or glass flood 72 which is scanned by the lens system of a camera 50', and the image of a glass bead or flood condition transmitted to an optoelectronic photo detector 74 being one of a group of detectors receiving signals from the camera 50' scanning all of the orifices of an orificed plate or bushing floor 16'.

The electrical output of the detector 74 is amplified and transmitted to a means such as a solenoid-operated valve means 78 connected by a tube 82 with a supply of compressed air or other fluid that may be directed upon the glass flood, a glass bead or discontinuity at a stream flow orifice to eliminate the flood, glass bead or discontinuity and restore normal stream flow.

The valve means 78 actuated by the amplified output from one of the detectors 74 directs a stream of air or other fluid by a tube 82, shown in FIGS. 1 and 3, to a nozzle 84 shown in FIG. 1. The nozzle is adjustable so as to direct a stream of air or fluid from the nozzle 84 onto the flood condition, glass bead or discontinuity of stream flow to eliminate the flood and restore normal stream flow from the particular orifice at which the flood condition, bead formation or discontinuity occurred.

It is to be understood that the single detector 74 illustrated in FIG. 3 is one of a matrix array of detectors receiving signals from the camera or lens system 50'. Any detector of the array may indicate a stream flow discontinuity, glass bead or flood condition and is oriented in circuit with the valve means 78 for effecting actuation of the valve means to direct fluid such as air onto a flood condition at any of the orifice regions of the stream flow plate or bushing floor 16'.

FIG. 4 illustrates a schematic arrangement similar to that illustrated in FIG. 3 for detecting a filament break-out, glass bead, glass flood or other discontinuity of stream flow and transmitting the image thereof to a detector, the electrical output of which may be employed to actuate a visual signal or an audible signal or an instrumentality for effecting remedial action to restore normal stream flow.

The orifice plate or bushing floor 16'' has a bead of glass or glass flood 88 scanned by the video camera 50'' or lens system which transmits the image of the glass bead, flood condition or discontinuity to an optoelectronic photo detector 92 of an integrated photo detector amplifier 94. The detector 92 is one of an array of detectors or detector amplifier 94 receiving signals from the camera or lens system 50'' scanning all of the orifices of the orifice plate or bushing 16''.

The signal received by the detector 92 sensing the glass bead, glass flood or stream flow discontinuity is amplified and the electrical output transmitted to an arrangement 96 equipped with a signal light 98 thus indicating to the operator that an abnormality of stream flow has occurred at the orifice plate or bushing floor 16''.

If desired, the amplified output of the optoelectronic detector 92 is transmitted by a conductor 100 to a sound producing unit or annunciator 102 producing an audible sound indicating to an operator that an abnormality exists at the orifice plate or bushing floor 16''.

An operator upon visibly noting the illuminated signal light 98 or receiving an audible signal from the unit 102 may immediately take necessary action to eliminate the glass bead, glass flood or discontinuity and restore normal stream flow.

An instrumentality or unit 104 may receive the amplified output from the photo detector 92 by connecting means 106 shown in broken lines in FIG. 4. The instrumentality 104 may include an automatically-operated or solenoid-operated valve such as valve 78 shown in FIG. 3 for directing a stream of fluid such as air onto a glass flood or discontinuity 88 to promote restoration of normal glass stream flow. The instrumentality 104 may activate other means for restoring normal stream flow from the orifice plate or bushing floor.

FIG. 5 illustrates an arrangement wherein a fiber optic means may be utilized to transfer a signal of a glass bead, glass flood or other discontinuity resulting from a filament break-out to a light sensitive and/or spectrally sensitive detector matrix at a monitoring screen such as the screen 54 shown in FIG. 2, or the signal amplified for activating a valve means such as indicated at 78 in FIG. 3, or activating an illuminated visual signal such as shown at 98 in FIG. 4, or an audible signal or annunciator such as shown at 102.

FIG. 5 schematically illustrates an orifice plate or bushing floor 16a, a glass bead, flood condition or discontinuity of stream flow being indicated at 110. A lens system or camera 50a is arranged to scan the orifice or stream flow region of the orifice plate or bushing floor 16a and the image transmitted to an optoelectronic photo detector 112. The image detected by detector 112 is transferred to a second or coupling detector 114. The detector 114 transmits the image through a fiber optic device or connector 116 to a detector or sensor 118 which may be in circuit with an amplifier providing an amplified electrical output.

A connector 120 may transmit the amplified output to a visual signal such as shown at 98 in FIG. 4, or to an audible signal or annunciator 102 shown in FIG. 4. The output may be utilized to activate means for restoring normal stream flow from the orifice at which a filament break-out, glass flood or discontinuity occurred.

Figure 8:
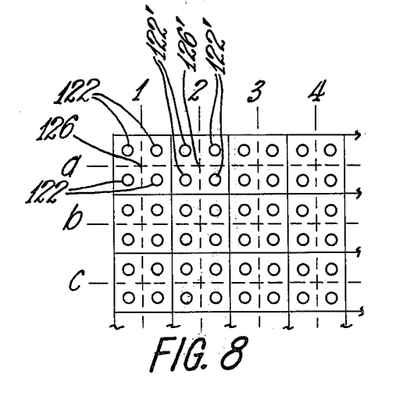
FIG. 8 is a view similar to FIG. 7 but illustrating an arrangement of images of the flow of glass streams wherein the condition of any of a group of four images of four glass streams is sensed or detected by a single detector.

FIG. 8 illustrates an optoelectronic matrix of a portion of glass cones at the glass stream flow orifices in a portion of an orifice plate or bushing floor, the circular images representing the cones of glass during normal stream flow from the orifices. The matrix of images is the result of optoelectronic detectors wherein each detector is responsive to the stream flow condition of a group of four orifices.

The lens system which may be similar to the lens system in the camera 50 scanning the area of an orifice plate or bushing floor provides signals for individual optoelectronic detectors, each detector embracing an image of the normal glass cones of four glass streams instead of a single cone of a glass stream. For example, the four images 122 in the upper left portion of the matrix of FIG. 8 are within the scope of one optoelectronic detector 126, the detector 126 being centrally positioned at the intersections of the sweep lines a1.

Each of the other groups of four images is embraced by individual detectors. For example, an optoelectronic detector 126' embraces the four images designated 122'. Thus if a filament break-out, glass flood or stream flow discontinuity occurs affecting any one of the group of images 122, a detector 126 will indicate a distorted image resulting from a filament break-out, glass flood or other discontinuity in the group.

Through this arrangement the operator is advised by a distorted image in any particular group of an abnormal condition of any one of four images in the group. The number of optoelectronic detectors is substantially reduced thus lowering the cost of the monitoring arrangement for an orifice plate or bushing floor area. While FIG. 8 is illustrative of four images within the scope of a single optoelectronic detector, it is to be understood that groups containing more or less images for each detector may be utilized.

Figure 9:
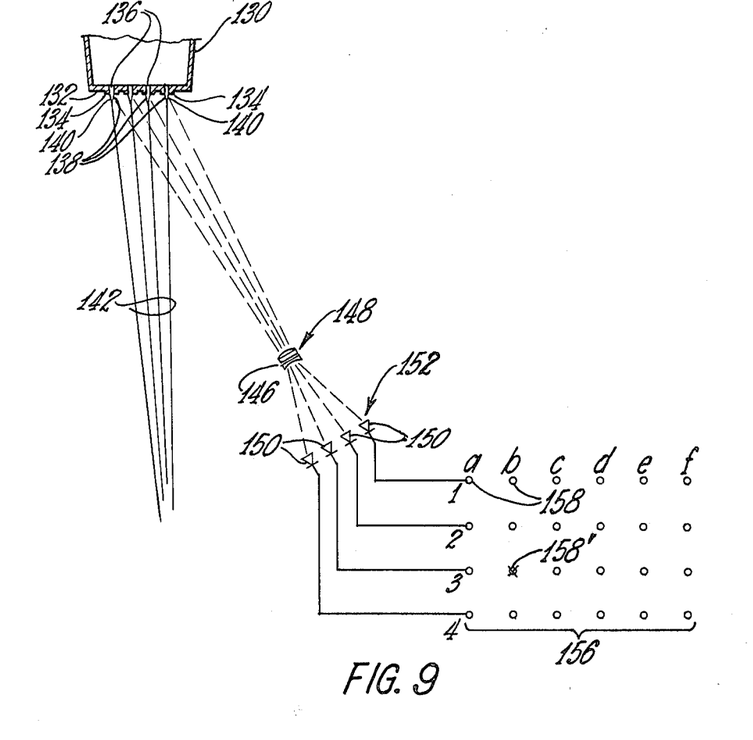
FIG. 9 is a schematic illustration of another form of the invention utilizing an image of the orifice area of a stream feeder or bushing focused on a detector matrix array, the detector array being cabled in correspondence with a receiving matrix of electronic switches, the switches being adapted to energize a suitable response to an abnormality or interruption of glass stream flow.

FIG. 9 illustrates a modified arrangement wherein an optoelectronic detector of a matrix or group of detectors or sensors actuates an electronic gate or switch upon a filament break-out, glass flood or discontinuity whereby the gate or switch may initiate remedial means for restoring normal stream flow from an orifice plate or bushing floor. FIG. 9 illustrates a bushing or stream feeder 130 having a floor or orifice plate 132 provided with a plurality of short length depending projections or tips 134, each provided with a glass stream flow orifice 136.

Glass streams 138 flowing from the orifices are in the form of cones 140 at the exits of the orifices, the glass streams being attenuated into fibers or filaments 142 as a strand or group of the filaments is wound into a package as illustrated in FIG. 1.

A lens system 146 of a video camera 148 projects signals on optoelectronic detectors or sensors 150 of a matrix 152 of detectors or sensors, the matrix 152 of detectors being an array of the optoelectronic sensors or detectors arranged in correspondence with the orientation of the stream flow orifices in short length projections depending from the bushing floor 138. It is to be understood that the system may be used with an orifice plate having orifices without projections through which flow glass streams.

The image of the bushing orifice area is focused on the detector matrix array 152 by the lens system 146 of the camera 148 in lieu of the vertical and horizontal sweep electronics. The detectors or sensors 150 of the matrix array 152 are cabled in correspondence with a receiving matrix 156 of electronic switches or "gates" 158.

The matrix of switches or "gates" is arranged in vertical rows designated a, b, c, etc. and horizontal rows 1, 2, 3, etc. Assuming that a switch or "gate" 158' at the intersection of vertical line b and horizontal line 3 is activated by a sensor 150 by reason of a filament break-out, glass flood, glass bead or other discontinuity, the activated switch 158' may be arranged to energize a suitable response such as a signal lamp of the character shown at 96 in FIG. 4 or an annunciator or signal 102. The signal provided in this manner alerts the operator to take action to restore normal glass stream flow.

The activated electronic switch 158' may actuate valve means for directing a jet of air or other fluid onto the glass flood or stream discontinuity to restore normal stream flow. In this manner any of the detectors 150 detecting a filament break-out, glass flood, glass bead or stream discontinuity transmits a signal to one of the electronic switches or "gates" 158 to initiate action to restore normal stream flow at any of the stream flow orifices.

It is apparent that, within the scope of the invention, modifications and different arrangements may be made other than as herein disclosed, and the present disclosure is illustrative merely, the invention comprehending all variations thereof.

I claim:

1. The method involving flowing streams of heat-softened glass from orifices in a stream feeder, attenuating the streams to filaments, scanning the stream flow region of the feeder by a lens system of a closed loop video camera, transmitting the image of the stream flow region on a matrix of optoelectronic photo detectors wherein a detector is responsive to an image of the accumulation of glass occurring at an orifice by reason of a filament break-out, the image of the accumulation of glass adapted to cause a change of state of the detector, transmitting from the detector the image of the accumulation of glass onto a receiver screen having a matrix of sweep line intersections corresponding to the spatial locations of the orifices in the feeder whereby the image of the glass accumulated at the orifice at which the filament break-out occurs visually appears on the screen.

2. The method involving flowing streams of heat-softened glass from orifices in a stream feeder, attenuating the streams to filaments, scanning the stream flow region of the feeder by a lens system, focusing the stream flow region on a matrix of optoelectronic photo detectors wherein a detector is responsive to a glass flood occurring at an orifice by reason of a filament break-out, the image of the glass flood adapted to cause a change of state of the said detector, transmitting by the detector an image of the glass flood onto a screen of a receiver having a matrix of intersections corresponding to the spatial locations of the orifices in the feeder whereby the image of the glass flood at the orifice at which the filament break-out occurs visually appears on the screen.

3. The method involving flowing streams of heat-softened glass from orifices in a stream feeder, attenuating the streams to filaments, scanning the stream flow region of the feeder by a lens system, focusing the stream flow region on a matrix of optoelectronic photo detectors wherein a detector is responsive to a bead of glass that may form at an orifice by reason of a filament break-out, the image of the bead of glass adapted to cause a change of state of the said detector, transmitting by the detector an image of the bead of glass onto a screen of a receiver having a matrix of intersections corresponding to the spatial locations of the orifices in the feeder whereby the image of the bead of glass formed at the orifice at which the filament break-out occurs visually appears on the screen.

4. The method involving flowing streams of heat-softened glass from orifices in a stream wherein cones of glass of the streams depend from the orifices and the streams attenuated to filaments and wherein a filament break-out may occur resulting in an accumulation of glass at the orifice of the break-out, automatically and remotely indicating the occurrence of a filament break-out including scanning the stream flow region of the feeder by a lens system of a closed-loop video camera, reproducing the images of the glass cones at the stream flow region as a matrix of dots on a screen of a video receiver by a matrix of optoelectronic photo detectors, the matrix of dots corresponding to the spatial locations of the orifices in the stream feeder, the image of the accumulated glass at the orifice at which the filament break-out occurs detected by one of the detectors appears in place of a dot.

5. The method involving flowing streams of heat-softened filament-forming mineral material from orifices in a stream feeder, attenuating the streams to filaments, scanning the stream flow region of the feeder by a lens system of a closed-loop video camera, transmitting the image of the stream flow region onto a matrix of optoelectronic photo detectors of a character wherein a detector is responsive to an image of an accumulation of material occurring at an orifice by reason of a filament break-out, the image of the accumulated material adapted to cause a change of state of the detector receiving the image, transmitting by the output of the detector the image of the accumulation of material onto a screen of a receiver having a matrix of sweep line intersections corresponding to the spatial locations of the orifices in the feeder whereby the image of the accumulated material at the orifice at which the filament break-out occurred visually appears on the screen.

6. The method involving flowing streams of heat-softened glass from orifices in a stream feeder, attenuating the streams to filaments, scanning the stream flow region of the feeder by a lens system of a closed-loop video camera, transmitting the image of the stream flow region onto a matrix of optoelectronic photo detectors of a character wherein a detector is responsive to an image of an accumulation of glass occurring to an orifice by reason of a filament break-out, the image of the accumulation of glass adapted to cause a change of state of the detector receiving the image, transmitting by the output of the detector the image of the accumulation of glass onto a screen of a receiver having a matrix of sweep line intersections corresponding to the spatial locations of the orifices in the feeder whereby the image of the glass accumulated at the orifice at which the filament break-out occurred visually appears on the screen.

7. The method involving flowing streams of heat-softened glass from orifices in a stream feeder wherein cones of glass depend from the orifices and the streams attenuated to filaments and wherein a filament break-out may occur resulting in an accumulation of glass at an orifice, automatically and remotely indicating the occurrence of a filament break-out including scanning the stream flow region of the feeder by a closed-loop video camera, transmitting the images of the cones of glass from the video camera onto a matrix of electronic detectors, transmitting the output of the detectors onto the screen of a receiver as a matrix of dots, the matrix of dots corresponding to the spatial locations of the orifices in the stream feeder, the image of glass accumulated at the orifice at which the filament break-out occurred appears on the screen in place of a dot.

8. The method involving flowing streams of heat-softened glass from orifices in a stream feeder, attenuating the streams of glass to filaments, scanning the stream flow region of the feeder by a lens system, focusing the image of the stream flow region on a matrix of optoelectronic photo detectors corresponding to the spatial locations of the orifices in the feeder, one of the detectors being affected by a filament break-out resulting in a collection of glass at the orifice at which the break-out occurred, the state of the detector effected by the break-out being changed, the detector affected by the break-out transmitting an image of the collected glass onto a screen of a receiver having matrix intersections corresponding to the spatial locations of the orifices in the feeder, the image of collected glass provided by the output of the affected detector appearing at a matrix intersection corresponding to the orifice from which the break-out occurred.

9. The method involving flowing streams of heat-softened glass from orifices in a stream feeder, attenuating the streams of glass to filaments and wherein a filament break-out may occur resulting in an accumulation of glass at the orifice at which the filament break-out occurred, scanning the orifice region of the stream feeder by a lens system of a video camera, transmitting the image of the collected glass to an optoelectronic detector of a matrix of optoelectronic detectors corresponding to the orifices in the stream feeder, the detector affected by the accumulated glass transmitting an image of the collected glass onto the screen of a video receiver, the screen being provided with a matrix of sweep line intersections corresponding to the spatial locations of the orifices in the stream feeder, the image of the collected glass being at one of the matrix intersections thereby indicating on the screen the particular orifice at which the filament break-out has occurred.

10. The method involving flowing streams of heat-softened glass from orifices in a stream feeder, attenuating the streams to filaments and wherein a filament break-out results in an accumulation of glass at an orifice, scanning the stream flow region of the feeder by a lens system of a closed-loop video camera, focusing the image of the stream flow region on a matrix of optoelectronic photo detectors, an accumulation of glass at an orifice following a filament break-out effecting the state of an optoelectronic photo detector, transmitting the image of the accumulated glass from the affected detector to a television screen, the television screen providing sweep line matrix intersections corresponding to the spatial locations of the orifices in the stream feeder, the output of the detector affected by the image of the accumulated glass providing a visual image of the accumulated glass on the screen at the matrix intersection corresponding to the orifice at which the break-out occurred.

11. The method involving flowing streams of heat-softened glass from orifices in a stream feeder, attenuating the streams to filaments, scanning the stream flow region of the feeder by a lens system, focusing the stream flow region by the lens system on a matrix of detectors wherein a detector is responsive to the image of an accumulation of glass occurring at an orifice by reason of a filament break-out, the image of the accumulation of glass adapted to cause a change of state of the detector, and transmitting the output of the detector subjected to change of state for energizing a signal indicating that a filament break-out has occurred.

12. The method according to claim 11 wherein the output of the change of state of the detector is transmitted to an illuminated signal for indicating that a filament break-out has occurred.

13. The method according to claim 11 wherein the output of the change of state of the detector is transmitted to an annunciator signal for indicating that a filament break-out has occurred.

14. The method involving flowing streams of heat-softened glass from orifices in a stream feeder, attenuating the streams to filaments, scanning the stream flow region of the feeder by a lens system, focusing the stream flow region by the lens system on a matrix of detectors wherein a detector is responsive to the image of an accumulation of glass occurring at an orifice by reason of a filament break-out, the image of the accumulation of glass adapted to cause a change of state of the detector, and transmitting the output of the detector subjected to change of state for activating means for delivering fluid onto the accumulation of glass for restoring normal glass stream flow from the stream feeder.

15. Apparatus for detecting a filament break-out wherein streams of heat-softened filament-forming material flow from orifices in a stream feeder which are attenuated to filaments and wherein a filament break-out may occur resulting in an accumulation of the material at the orifice of the stream from which the break-out occurred including, in combination, a lens system for scanning the stream flow region of the feeder, a matrix of electronic detectors receiving optic signals through the lens system from the stream flow region, at least one of the electronic detectors being affected by an image from the lens system of an accumulation of the material resulting from a filament break-out at a stream flow orifice, and means responsive to the output of the affected electronic detector indicating the occurrence of a filament break-out.

16. Apparatus according to claim 15 wherein the means responsive to the output of the affected electronic detector is an illuminated signal.

17. Apparatus according to claim 15 wherein the means responsive to the output of the affected electronic detector is an annunciator.

18. Apparatus for detecting a filament break-out wherein streams of heat-softened filament-forming material flow from orifices in a stream feeder which are attenuated to filaments and wherein a filament break-out may occur resulting in an accumulation of the material at the orifice of the stream from which the break-out occurred including, in combination, a lens system for scanning the stream flow region of the feeder, a matrix of electronic detectors receiving optic signals through the lens system from the stream flow region, at least one of the electronic detectors being affected by an image from the lens system of an accumulation of the material resulting from a filament break-out at a stream flow orifice, and an instrumentality for initiating flow of fluid onto the accumulation of material for eliminating the accumulation of material at the orifice of the stream from which the break-out occurred, the output of the affected detector adapted to activate the instrumentality.

19. Apparatus for detecting a filament break-out wherein streams of heat-softened glass flow from orifices in a stream feeder which are attenuated to filaments and wherein a filament break-out may occur resulting in an accumulation of glass at the orifice of the stream from which the breakout occurred including, in combination, a lens system for scanning the stream flow region of the feeder, a matrix of electronic detectors receiving optic signals through the lens system from the stream flow region, at least one of the electronic detectors being affected by an image from the lens system of an accumulation of glass resulting from a filament break-out at a stream flow orifice, and signal means responsive to the output of the affected electronic detector for indicating the occurrence of a filament break-out.

20. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the break-out occurred including, in combination, a lens system for scanning the stream flow region of the feeder, a matrix of electronic detectors receiving optic signals through the lens system from the stream flow region, at least one of the electronic detectors being affected by an image of an accumulation of glass at a stream flow orifice, a monitor screen, the output of said detector affected by the image of the accumulation of glass transmitting a visual indication of the accumulated glass onto the monitor screen.

21. Apparatus for detecting a filament break-out wherein streams of heat-softened filament-forming material flow from orifices in a stream feeder which are attenuated to filaments and wherein a filament break-out may occur resulting in an accumulation of the material at the orifice of the stream from which the break-out occurred including, in combination, a video camera for scanning the stream flow region of the feeder, a matrix of electronic detectors receiving optic signals through the camera from the stream flow region of the feeder, at least one of the electronic detectors being affected by an image of an accumulation of the material at a stream flow orifice, a receiver having a monitor screen, the output of said detector affected by the image of the accumulation of the material transmitting a visual indication of the accumulated material onto the monitor screen.

22. Apparatus according to claim 21 including spatial filter means positioned in advance of the electronic detectors to reduce the optical interference from regions adjacent the orifice at which the break-out occurred.

23. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a closed-loop video camera having a lens system scanning the stream flow region of the feeder, a plurality of optoelectronic photo detectors, the image of an accumulation of glass occurring at an orifice by reason of a filament break-out effecting a change in the state of at least one of the detectors, a receiver having a screen on which appears a matrix of vertical and horizontal sweep lines, the spatial intersections of the sweep lines corresponding to the locations of the orifices of the stream flow area of the feeder, and a visual image of the accumulated glass affecting the state of a detector being transmitted onto the screen at the intersection of the sweep lines corresponding to the location of the orifice at which the filament break-out occurred.

24. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a closed-loop video camera having a lens system scanning the stream flow region of the feeder, a plurality of optoelectronic photo detectors, the image of an accumulation of glass occurring at an orifice by reason of a filament break-out effecting a change in the state of at least one of the detectors by the output of the video camera, and an instrumentality for activating delivery of fluid onto the accumulation of glass for eliminating the accumulation of glass at the orifice of the steam from which the break-out occurred and restoring normal stream flow, the output of the detector affected by the image of the accumulation of glass adapted to activate the instrumentality.

25. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a closed-loop video camera having a lens system scanning the stream flow region of the feeder, a plurality of optoelectronic photo detectors, the image of an accumulation of glass occurring at an orifice by reason of a filament break-out effecting a change in the state of at least one of the detectors by the output of the video camera, and a signal means for indicating a filament break-out, the output of the detector affected by the image of the accumulation of glass adapted to activate the signal means.

26. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a closed-loop video camera having a lens system scanning the stream flow region of the feeder, a plurality of optoelectronic photo detectors, the image of an accumulation of glass occurring at an orifice by reason of a filament break-out effecting a change in the state of at least one of the detectors by the output of the video camera, tubular means for directing fluid onto the accumulation of glass on the stream feeder surface for eliminating the accumulation of glass, and valve means associated with the tubular means for controlling fluid flow to the tubular means, said valve means being responsive to the output of the detector affected by the image of the accumulation of glass for controlling said valve means.

27. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a lens system scanning the stream flow region of the feeder, a matrix array of optoelectronic photo detectors arranged in correspondence with the stream flow orifices of the feeder orifice area, a matrix array of electronic switches in correspondence with the matrix array of optoelectronic photo detectors, each of the electronic switches being responsive to an optoelectronic photo detector, the image of an accumulation of glass occurring at an orifice by reason of a filament break-out effecting a change in the state of at least one of the optoelectronic photo detectors, the output of the affected optoelectronic photo detector adapted to activate the corresponding electronic switch to actuate a signal providing an indication of a filament break-out and the relative position of the filament break-out.

28. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a closed-loop video camera having a lens system scanning the stream flow region of the feeder, a matrix of optoelectronic photo detectors, the image of an accumulation of glass occurring at an orifice by reason of a filament break-out effecting a change in the state of at least one of the detectors by the output of the video camera, a matrix of amplifiers for the matrix of detectors, at least one of the amplifiers amplifying the output of the detector subjected to a change in state by the output of the video camera, and a signal means, the amplified output of the said detector subjected to a change of state arranged to activate the signal means to indicate a filament break-out.

29. Apparatus according to claim 28 wherein the activated signal means is an illuminated means.

30. Apparatus according to claim 28 wherein the activated signal means is an annunciator.

31. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a lens system scanning the stream flow region of the feeder, a group of optoelectronic detectors arranged in correspondence with the orifices of the feeder orifice area, a group of receiving detectors adapted to receive the output from the optoelectronic detectors, fiber optic means transmitting the output of the optoelectronic detectors to the receiving detectors, the image of an accumulation of glass occurring at an orifice by reason of the filament break-out effecting a change in the state of at least one of the optoelectronic detectors, the output of the affected optoelectronic photo detector being transmitted through the fiber optic means to one of the receiving detectors, the output of the receiving detector activating means for indicating a filament break-out.

32. Apparatus for detecting a filament break-out wherein streams of heat-softened glass flow from orifices in a glass stream feeder which are attenuated to filaments and wherein a filament break-out may occur resulting in an accumulation of glass at the orifice of the stream from which the filament break-out occurred including, in combination, a lens system scanning the stream flow region of the feeder, a first matrix array of optoelectronic photo detectors arranged in correspondence with the feeder orifice area, a second matrix array of coupling detectors affected by the output of the first array of optoelectronic photo detectors, a third array of receiving detectors, fiber optic means transmitting the output of the coupling detectors to the array of receiving detectors, the image of an accumulation of glass occurring at an orifice by reason of the filament break-out effecting a change in the state of at least one of the optoelectronic photo detectors of the first matrix array of detectors, the output of the affected optoelectronic photo detector of the first matrix being communicated through a coupling detector of the second array of detectors to a receiving detector of the third array of detectors by the fiber optic means, the output of the receiving detector activating means for indicating a filament break-out.

* * * * *

UNITED STATES PATENT AND TRADEMARK OFFICE
CERTIFICATE OF CORRECTION

PATENT NO. : 4,342,580
DATED : August 3, 1982
INVENTOR(S) : Cletis L. Roberson

It is certified that error appears in the above—identified patent and that said Letters Patent is hereby corrected as shown below:

Column 6, line 48 should read:

one" state which is distinctly visible on the screen 54 as

Column 6, line 59 should read:

Either the presence of or the absence of the "T-V"

Column 11, line 12 should read:

softened glass from orifices in a stream feeder wherein cones of

Signed and Sealed this

Twelfth Day of October 1982

[SEAL]

Attest:

Attesting Officer

GERALD J. MOSSINGHOFF

Commissioner of Patents and Trademarks